(12) United States Patent
Newville

(10) Patent No.: US 10,995,508 B2
(45) Date of Patent: May 4, 2021

(54) SWIMMING POOL CLEANING TOOL WITH PRE-FABRICATED REMOVABLE ATTACHMENT SECTIONS

(71) Applicant: The Boden Co., Clearwater, FL (US)

(72) Inventor: Eric Newville, Clearwater, FL (US)

(73) Assignee: The Boden Co., Clearwater, FL (US)

( * ) Notice: Subject to any disclaimer, the term of this patent is extended or adjusted under 35 U.S.C. 154(b) by 61 days.

(21) Appl. No.: 16/558,769

(22) Filed: Sep. 3, 2019

(65) Prior Publication Data

US 2021/0062528 A1    Mar. 4, 2021

(51) Int. Cl.
| | |
|---|---|
| *E04H 4/16* | (2006.01) |
| *B23P 6/00* | (2006.01) |
| *B25G 1/04* | (2006.01) |
| *B25G 3/28* | (2006.01) |

(52) U.S. Cl.
CPC .............. *E04H 4/1609* (2013.01); *B23P 6/00* (2013.01); *B25G 1/04* (2013.01); *B25G 3/28* (2013.01)

(58) Field of Classification Search
CPC .......... B25G 1/04; B25G 3/28; E04H 4/1609; Y10T 403/11; A46B 5/0095; A46B 5/02
USPC ......... 403/2; 248/548; 15/143.1, 144.3, 145; 52/98
See application file for complete search history.

(56) References Cited

U.S. PATENT DOCUMENTS

| | | | | |
|---|---|---|---|---|
| 2,645,488 A | * | 7/1953 | Jorgenson | F41B 15/02 119/712 |
| 2,712,950 A | * | 7/1955 | Siebert | A46B 5/00 285/7 |
| 2,724,610 A | * | 11/1955 | Fitzgerald | A63B 47/02 294/55.5 |
| 2,945,084 A | * | 7/1960 | Daggett | H01Q 1/085 174/86 |
| 3,220,037 A | * | 11/1965 | Ruhling | E04H 4/1609 15/1.7 |
| 3,304,031 A | * | 2/1967 | Mulquin | B64F 1/06 244/63 |
| 3,628,296 A | * | 12/1971 | Henry | E01F 9/635 52/98 |
| 3,835,615 A | * | 9/1974 | King, Jr. | B23P 9/025 403/408.1 |
| 4,610,432 A | * | 9/1986 | Lewis | A63K 1/00 256/1 |
| 5,150,495 A | * | 9/1992 | Discko, Jr. | A46B 5/0075 15/106 |
| 5,301,389 A | * | 4/1994 | Engel | B66F 13/00 16/422 |

(Continued)

*Primary Examiner* — Orlando E Aviles
*Assistant Examiner* — Joel D Crandall
(74) *Attorney, Agent, or Firm* — Smith & Hopen, P.A.; Steven M. Forte; Andriy Lytvyn

(57) ABSTRACT

A pool cleaning tool have a pole partitioned into a first section and a second section. The first section is positioned at a proximal end of the pole and is configured to be a coupling site for a cleaning attachment. A visual indicium is disposed on the pole delineating a boundary separating the first and the second sections. Each section having a pair of apertures configured to align with complementary apertures disposed on the cleaning attachment. Responsive to one of the apertures in the first section becoming deformed, the cleaning tool can be repaired by severing the first section from the pole along the visual indicium and using the second section as a new coupling site for the cleaning attachment.

13 Claims, 7 Drawing Sheets

(56) References Cited

U.S. PATENT DOCUMENTS

| | | | | |
|---|---|---|---|---|
| 5,384,930 | A * | 1/1995 | Uno | A46B 5/0062 116/212 |
| 6,049,934 | A * | 4/2000 | Discko | A46B 5/00 15/105 |
| 6,279,189 | B1 * | 8/2001 | Cassar | A46B 5/0062 15/144.1 |
| 6,516,573 | B1 * | 2/2003 | Farrell | E01F 9/635 116/63 R |
| 6,925,686 | B2 * | 8/2005 | Heathcock | B25G 1/04 15/144.4 |
| 7,076,826 | B2 * | 7/2006 | Hochanadel | B05C 17/00 15/143.1 |
| 7,409,740 | B1 * | 8/2008 | Geigan | E04H 4/1609 15/1.7 |
| 2003/0150478 | A1 * | 8/2003 | Biggs | B25G 1/04 134/6 |
| 2011/0107551 | A1 * | 5/2011 | Cassar | A47L 13/11 15/363 |
| 2014/0263031 | A1 * | 9/2014 | Lawson | B25G 3/18 210/470 |

* cited by examiner

SWIMMING POOL CLEANING TOOL WITH PRE-FABRICATED REMOVABLE ATTACHMENT SECTIONS

BACKGROUND OF THE INVENTION

1. Field of the Invention

This invention relates, generally, to extension poles. More specifically, it relates to pool extension poles for coupling various attachments thereto.

2. Brief Description of the Prior Art

For millions, maintenance and cleaning of a pool is a daunting and time-consuming task made exponentially more difficult by ineffective and broken pool cleaning equipment. Over the years, the design and functionality of pool cleaning tools has changed relatively little. Most pool-cleaning tools involve pool poles that are typically cheaply made and constructed out of thin and flimsy metals that are unable to withstand the wear and tear from performing routine pool maintenance.

A common type of pool-cleaning tool involves a pole with interchangeable attachments. Most maintenance tasks require coupling a task-specific attachment to a distal end of the pole. The coupling mechanisms currently known in the art generally include a plurality of longitudinally-spaced apertures positioned along the pole. Such apertures often create points of concentrated stress which commonly lead to cracking, tearing, bending, or disfiguration that renders the coupling mechanism non-functional. When the apertures become non-functional, consumers are forced to throw away the pole, even though only a small portion of the pole is damaged. This flaw leads to waste, frustration, and increased cost.

The problem becomes compounded with the ever-growing number, size, and weight of pool attachments that are available to users on the market. These attachments can include brushes, nets, and heavy vacuum heads. For example, when a brush is coupled to the pole, the attachment point, including the apertures, is routinely subjected to increased strain and stress from the user pushing down on the pole when scrubbing the hard bottom or sides of the pool. As a result, the apertures eventually deform, which compromises the structural integrity of the pool pole and renders the coupling mechanism non-functional.

One type of pool-cleaning tool commonly used in the field involves a telescopic pool pole. Telescopic design is beneficial because it increases the length of the pool-cleaning tool. However, as the length of the pole increases, the stress on the apertures also increases, thus accelerating the structural degradation of the coupling mechanism.

Accordingly, what is needed is a telescopic pool-cleaning tool having an improved and more durable coupling mechanism. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing, but heretofore unfulfilled need for a pool-cleaning tool having increased longevity and improved efficacy is now met by a new, useful, and nonobvious invention.

The novel structure pertains to a pool cleaning tool having an elongated pole comprising a proximal end, a distal end, and a central longitudinal axis. The central longitudinal axis extends from the proximal end to the distal end. The elongated pole being partitioned into a first section and a second section with the first section positioned closer to the distal end of the elongated pole and having a common boundary with the second section. A visual indicium is circumferentially disposed on the elongated pole delineating the common boundary separating the first section and the second section. The first pair of diametrically opposed apertures is disposed within the first section of the elongated pole. These apertures are aligned along a first transverse axis that is perpendicular to the central longitudinal axis of the elongated pole. The second pair of diametrically opposed apertures is disposed within the second section of the elongated pole. These apertures are aligned along a second transverse axis that is perpendicular to the central longitudinal axis of the elongated pole, such that the first and the second transverse axes reside in parallel planes.

The first section of the elongated pole is configured to be a coupling site for a cleaning attachment having a third pair of diametrically opposed apertures. The third pair of diametrically opposed apertures are configured to align with the first pair of apertures. The cleaning attachment has a locked configuration in which the cleaning attachment is securely coupled to the distal end of the pole. In the locked configuration, a first locking mechanism resides within at least one aperture of the first pair of apertures of the elongated pole and within at least one aperture of the third pair of apertures of the cleaning attachment. Because the first locking mechanism engages the aligned apertures of the pole and the cleaning attachment, the first locking mechanism secures the cleaning attachment against removal from the elongated pole.

Subsequent to the first section of the elongated pole being severed from the elongated pole at the visual indicium, the second section of the elongated pole is configured to become the coupling site for the cleaning attachment. To secure the cleaning attachment to the pole, the third pair of diametrically opposed apertures is brought in alignment with the second pair of apertures in the second section of the pole. In the locked configuration, the first locking mechanism is configured to reside within at least one of the apertures of the second pair of apertures of the pole and within at least one apertures of the cleaning attachment, thereby immobilizing the cleaning attachment against axial and rotational movement relative to the elongated pole.

In an embodiment, the pool cleaning tool further has an extension. The extension includes an extension pole. The extension pole is hollow and has an inner diameter greater than an outer diameter of the first pole, such that the extension pole is configured to telescopically receive the elongated pole. The elongated pole and the extension pole have an unlocked configuration, in which their collective length can be adjusted, and a locked configuration, in which their collective length is fixed. In the unlocked configuration, the first and the second poles telescopically slide relative to one another until a desired collective length is achieved. In the locked configuration, the movement of the elongated pole relative to the extension pole is restricted by a second locking mechanism. In an embodiment, the locked configuration is achieved by the second locking mechanism being disposed within the aligned apertures of the elongated pole and the extension pole, thereby immobilizing the elongated pole against telescopic movement relative to the extension pole.

A novel method of repairing a pool cleaning tool is detailed where a pool cleaning tool having an elongated pole partitioned into a first second and a second section is provided. The first section is positioned at a distal end of the elongated pole and the first section being a coupling site for a cleaning attachment. The first section has a first pair of diametrically opposed apertures disposed therein and a second section having a second pair of diametrically opposed apertures disposed therein. A visual indicium is disposed along the elongated pole and delineates a boundary separating the first section and the second section. A user identifies the first section as a damaged section having at least one deformed aperture. Next, the user identifies the visual indicium separating the first and the second sections. A cutting device is placed onto the elongated pole at the visual indicium and is configured to cut the elongated pole. The cutting device is operated such that the damaged section is severed from the elongated pole. Subsequent to severing the damaged section from the elongated pole the second section is used as a new coupling site for the cleaning attachment. The cleaning attachment has a third pair of apertures. A locking mechanism is operated to position a locking member within at least one aperture of the second pair of apertures of the extending pole and at least one aperture of the third pair of apertures is disposed of the cleaning attachment. The locking member restricts the cleaning attachment against removal from the second section of the elongated pole.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The novel structure depicted below pertains to a prefabricated pool cleaning tool that is altered after purchase. To extend the usable life the pool cleaning tool prefabricated sections are disposed on an end of an pole, such that when one section is rendered unusable a user may then remove the damaged prefabricated section to reveal a fresh set of apertures on an abutting section of the pole By having multiple prefabricated removable sections a user is able to extend the life and longevity of pool poles considerably.

Figure 1:
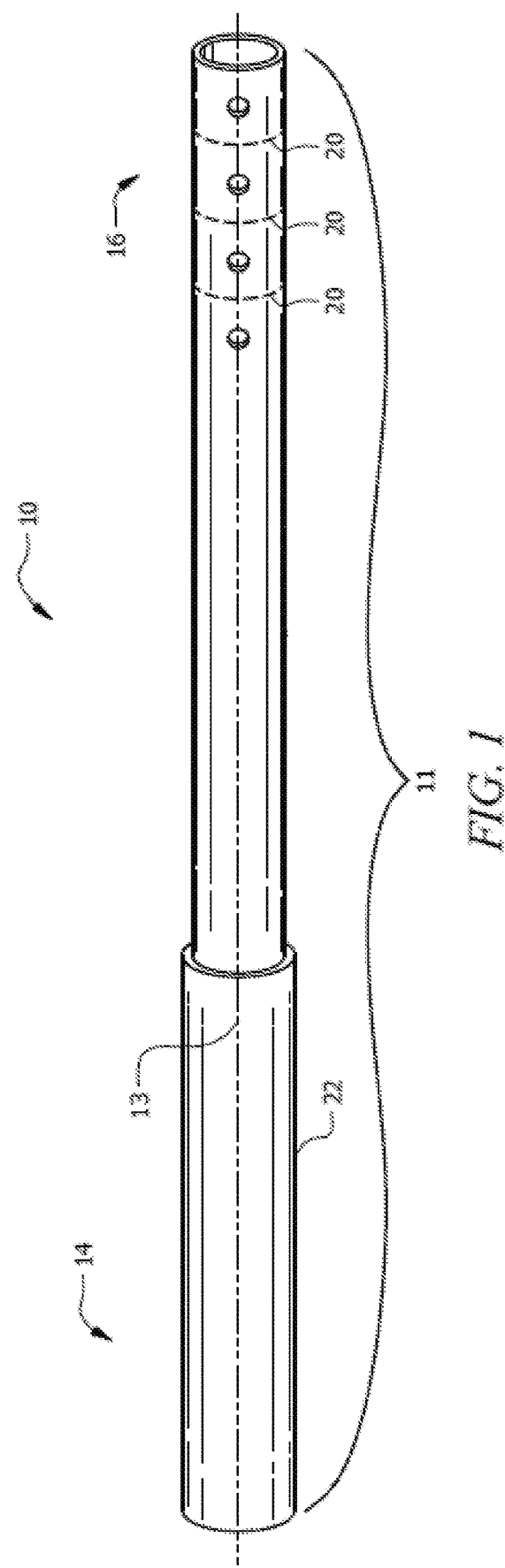
FIG. 1 is a perspective view of a pool cleaning tool.

FIG. 1 depicts a pool cleaning tool 10. Cleaning tool 10 comprises a pole 11 extending along a central longitudinal axis 13 from a proximal end 14 to a distal end 16. In an embodiment, pole 11 may have a bore, such that pole 11 is hollow. Pole 11 can have various cross-sectional geometries such as square, rectangular, or hexagonal. Pole 11 can be formed from aluminum, plastic, stainless steel, copper, bronze, brass, galvanized steel, carbon fiber, acrylonitrile-butadiene-styrene (ABS), polyvinylchloride (PVC), or other suitable material that one of ordinary skill in the art would appreciate as being appropriate for use in and/or around water, including saltwater.

Pool cleaning tool 10 includes a grip 22 disposed at proximal end 14 of pole 11. Grip 22 provides a surface for a user to securely grasp tool 10 during use, in both wet and dry conditions. Grip 22 has an inner diameter that is smaller than the outer diameter of pole 11, thereby permitting grip 22 to be interference fitted over proximal end 14 and frictionally retained thereon. In an embodiment, grip 22 may be secured to pole 11 by adhesive, fasteners, clamps, threaded engagements, or any other method known in the art to secure grip 22 to pole 11. Grip 22 may be made of an elastomeric material that encases proximal end 14 thereby providing a surface that allows a user to securely grip tool 10 in wet and/or dry conditions. In an embodiment, the grip may have coefficients of static and kinetic friction higher than coefficients of static and kinetic friction of the elongated pole.

Figure 2A:
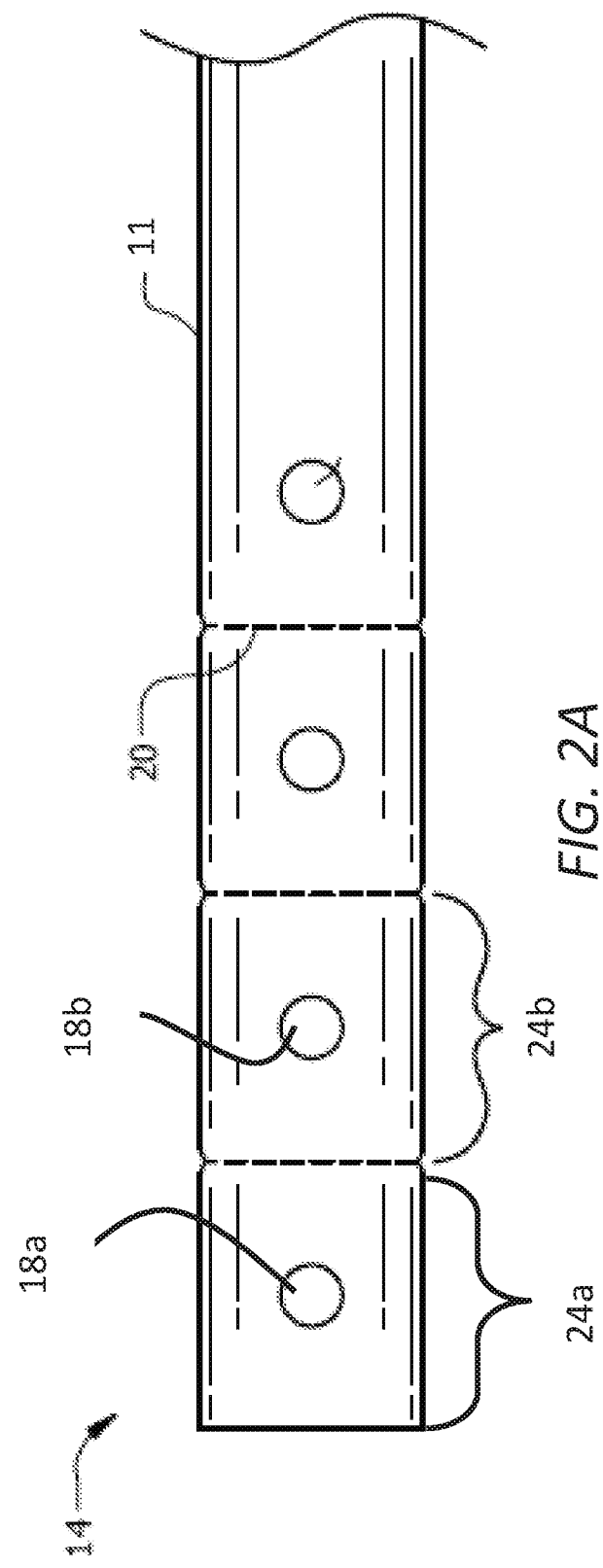
FIG. 2A is an orthogonal view of the second end of the pool cleaning tool.

FIG. 2A depicts distal end 16 of pole 11. Pole 11 is partitioned into a plurality of sections 24 and has at least a first section 24a and a second section 24b. Each section 24 includes a pair of apertures 18. First section 24a has a first pair of diametrically opposed apertures 18a, and second section 24b has a second pair of diametrically opposed apertures 18b.

Pole 11 has visual indicia 20 circumferentially disposed thereon. Visual indicium 20 serves to provide a visual and/or tactile indication of a boundary separating first section 24a and second section 24b. In an embodiment, pole 11 includes four sections 24, however, the number of sections 24 may vary depending on the overall length of tool 10. Visual indicia 20 are spaced apart about 15 mm to 45 mm, preferably 25.4 mm. These distances are important to preserve structural integrity of pole 11 because if apertures 18 are placed too closely to one another, pole 11 may become weakened and may be susceptible to breakage and/or other failures.

Figure 2B:
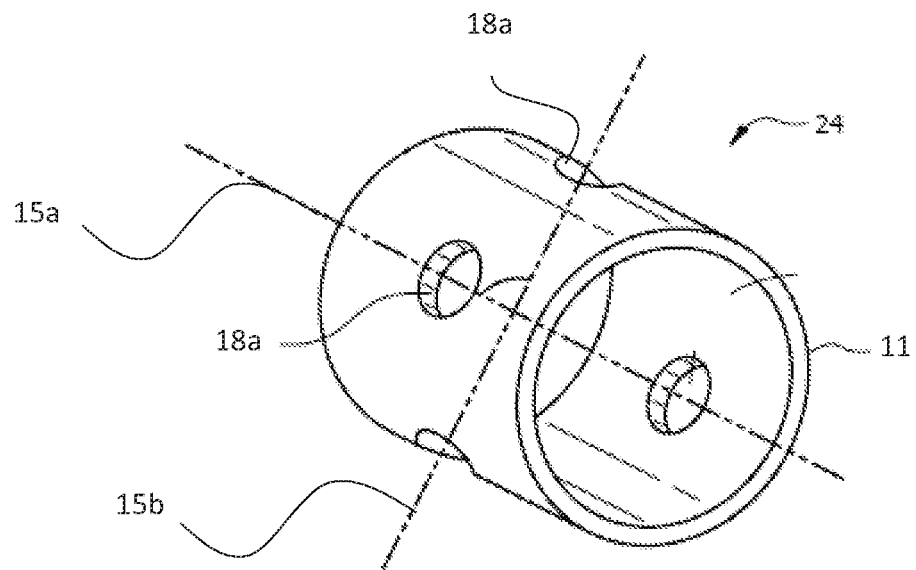
FIG. 2B is a perspective view of a section showing two pairs of apertures in an orthogonal relationship with one another.

FIG. 2B depicts a single section 24 having a pair of apertures 18a equidistantly spaced about a circumference of the pole 11. First pair of apertures 18a is aligned along first transverse axis 15a, which is perpendicular to central longitudinal axis 13. FIG. 2B depicts that additional apertures 18a may be disposed within the same section 24.

Figure 2C:
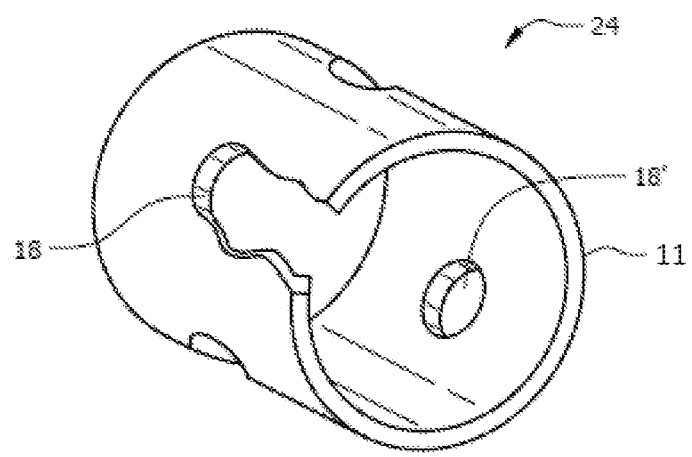
FIG. 2C is a perspective view of a section showing an aperture broken and non-functional.
Figure 3:
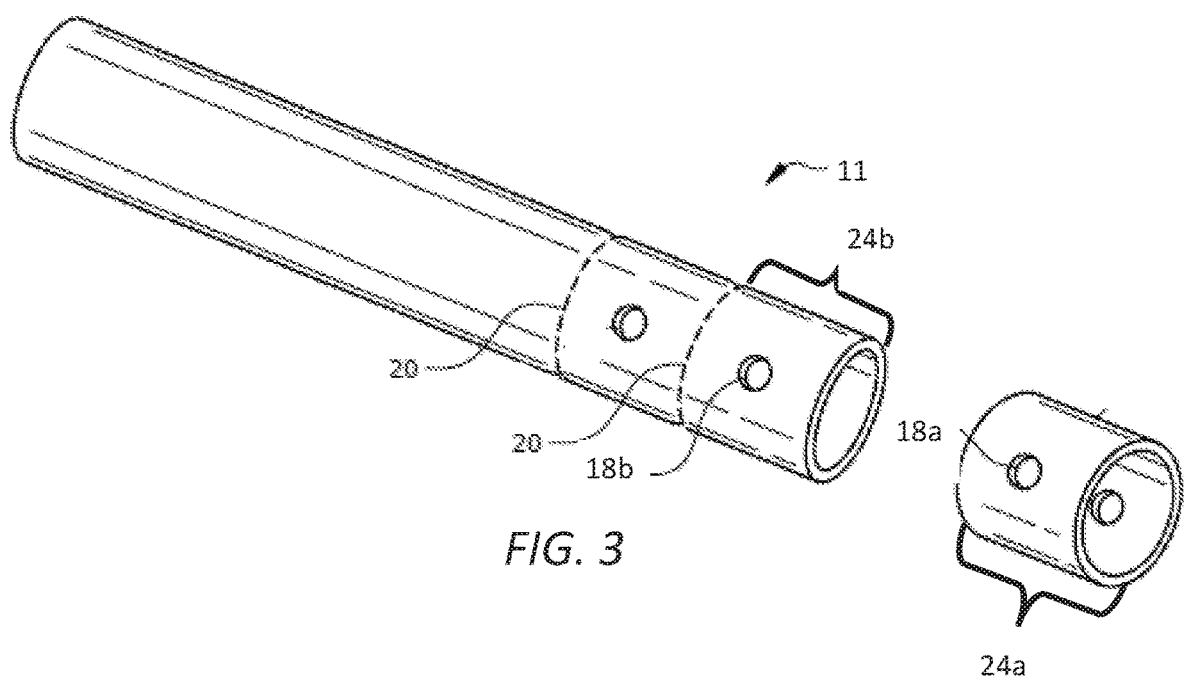
FIG. 3 is a perspective view depicting a section removed from a pool cleaning tool.
Figure 4:
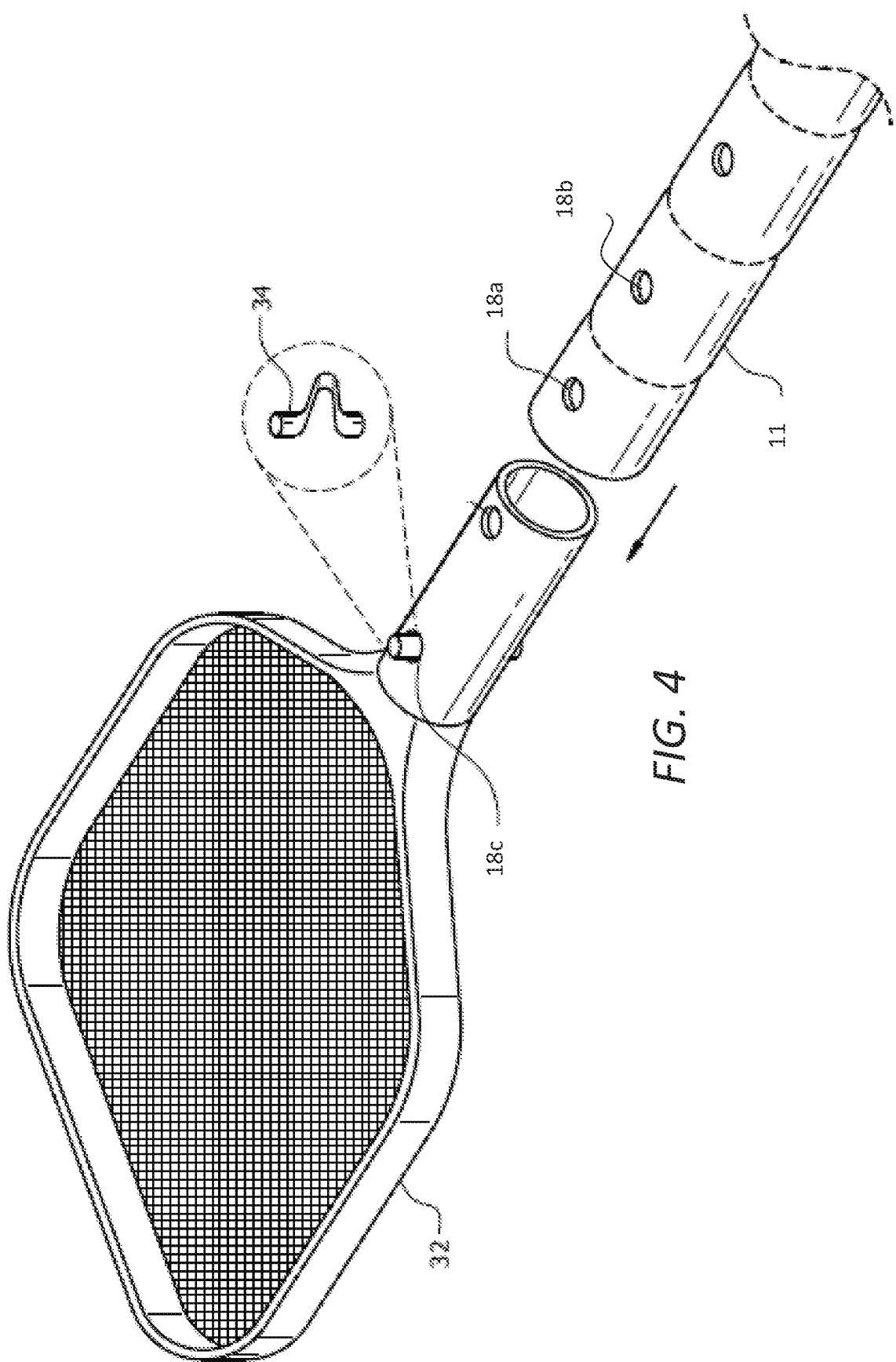
FIG. 4 is an in-use view of a pool cleaning tool with a cleaning attachment coupled to a skimmer net.

Referring briefly to FIG. 4, cleaning attachment 32 is coupled to first section 24a by, disposing locking member 34 through apertures 18. During routine use of pole LI, cleaning attachment 32 and locking member 34 exert a force on apertures 18 that deforms apertures 18. When one of apertures 18 becomes deformed, damaged, or otherwise rendered non-functional, as depicted in FIG. 2C, section 24 containing a damaged aperture 18 can be severed from pole 11. Visual indicia 20 provides a visual and/or tactile indication of where a user may sever sections 24 from pole 11. For example, visual indicia 20 maybe be a scored line such that when a user severs section 24 from pole 11 using a saw, the teeth on the blade of the saw reside within the scored line of visual indicia 20 allowing for a squared cut to be made, thereby facilitating clean removal of section 24 from pole 11. FIG. 3 depicts section 24a being severed from pole 11. In an embodiment, visual indicia 20 may be painted lines, dashed lines, raised lines, or any other visual and/or tactical indicators that provide a visual and/or physical guide for severing section 24a from pole 11.

FIG. 4 depicts an in-use embodiment of tool 10 having cleaning attachment 32 coupled to distal end of pole 11. Locking member 34 of a corresponding cleaning attachment 32 forms a mechanical communication with apertures 18, such that cleaning attachment 32 is secured to distal end 16 of tool 10. As depicted in FIG. 4, attachment 32 is a skimmer net, however, various cleaning attachments 32 may be swapped out and coupled to tool 10, including vacuum pumps, brushes, dusters, or other attachments 32 that would benefit from the extended reach that tool 10 provides. Cleaning attachment 32 is secured to pole 11 via a detent pin disposed through apertures 18a of pole 11 and apertures 18c of cleaning attachment 32.

Figure 5A:
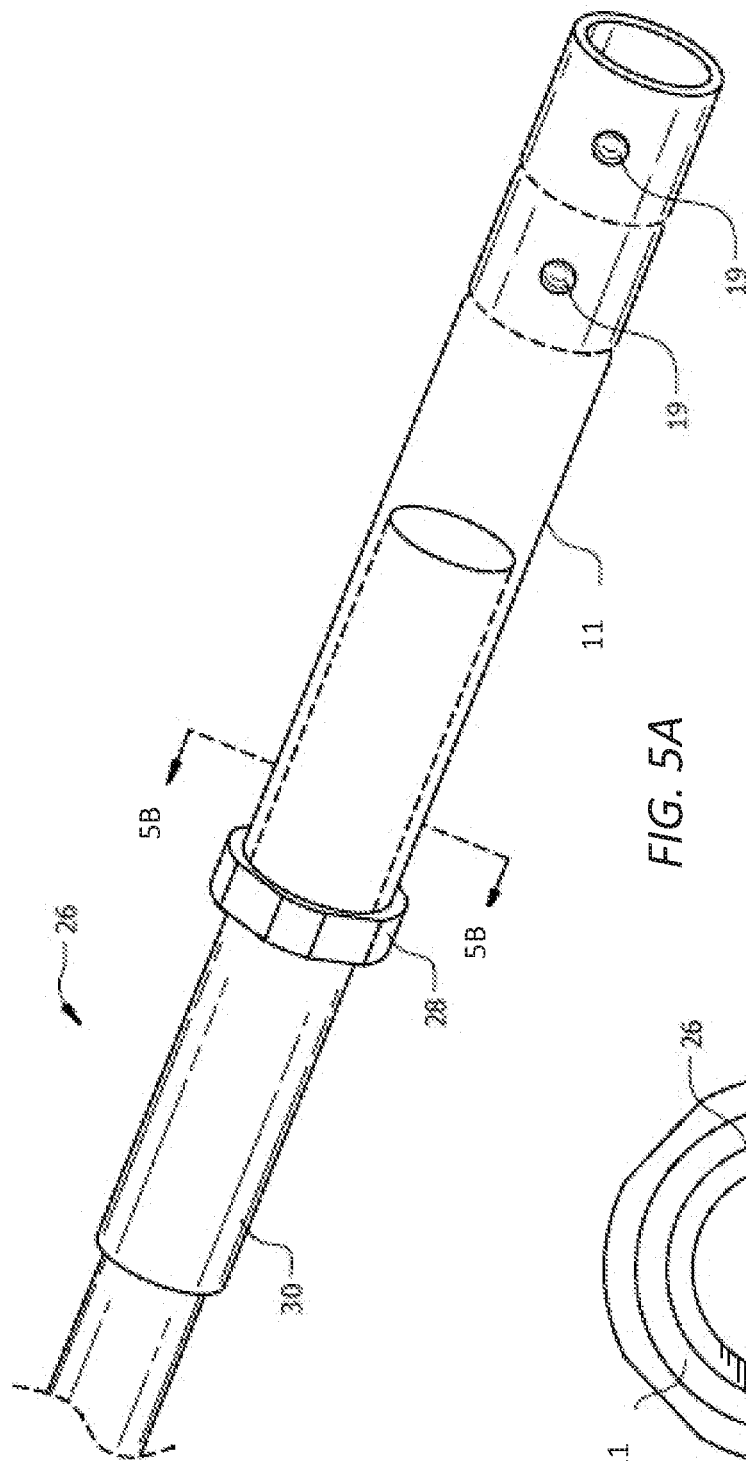
FIG. 5A is a perspective view of an embodiment depicting a telescopic pool cleaning tool with the second pole partially received within the first pole.
Figure 5B:
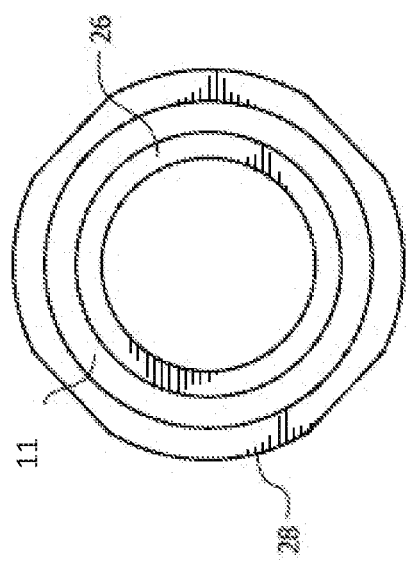
FIG. 5B is a cross-sectional view of a telescopic pool cleaning tool taken along lines A-A as identified in FIG. 5A.

FIGS. 5A and 5B depict an embodiment of tool 10 having second pole 26 partially telescopically received within the bore of pole 11. Second pole 26 has an outer diameter that is smaller than an inner diameter of pole 11 and is sized such that pole 11 receives second pole 26 therein. In this structural arrangement, second pole 26 is capable of telescopic movement with respect to pole 11. A locking mechanism 28 surrounds pole 11 and is in mechanical communication with second pole 26. Locking mechanism 28 exerts a force on each of first pole 11 and second pole 26 to immobilize second pole 26 against telescopic translation with respect to pole 11. In an embodiment, locking mechanism 28 may be a clutch lock, a split collar lock, a cam lock, spring button, spring button a-clutch lock, snap lock, detent pin, set knob, swaging, or any other type of locking mechanism that one of ordinary skill in the art would appreciate to prevent the longitudinal and/or rotational movement of the second pole 26 with respect to the first pole 11, or vice versa.

In an embodiment, pole 11 has an outer diameter greater than an inner diameter of second pole 26 such that second pole 26 is sized to be received and telescopically moveable within the bore of pole 11. In an embodiment, apertures 18 and visual indicia 20 may be disposed on body 30 of second pole 26, similarly to the visual indicia 20 discussed above.

In an embodiment depicted in FIG. 5A, apertures 18 may be replaced with indentations 19 disposed on pole 11, such that when attachment 32 is coupled thereto, the coupling mechanism of attachment 32 resides within the indentation 19 securing attachment 32 to tool 10.

Figure 6:
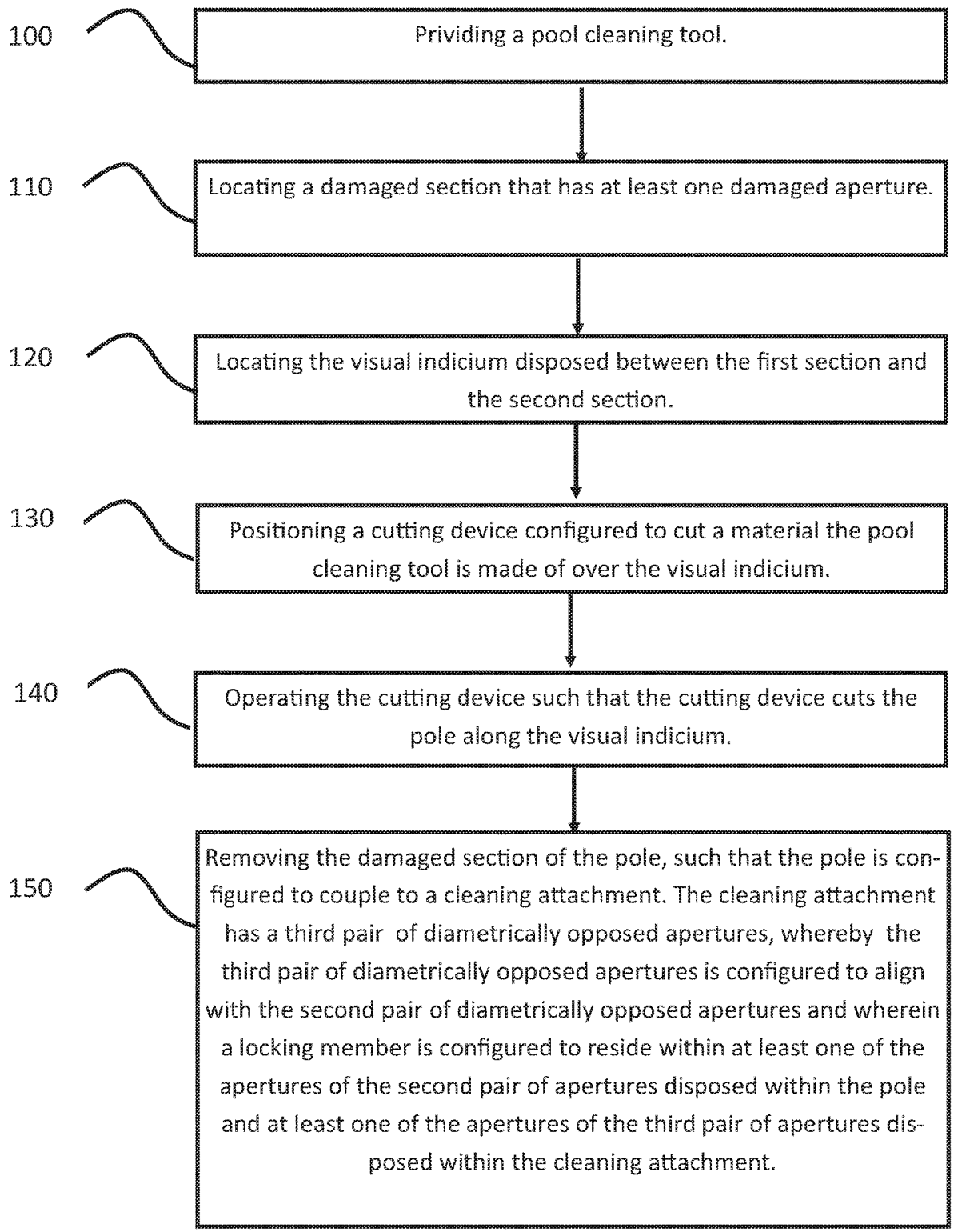
FIG. 6 is a flow chart depicting the steps of a method of repairing the pool pole.

Referring now to FIG. 6, in conjunction with FIGS. 1-5B, an exemplary process flow diagram is provided, depicting a method for the removal of sections 24 from pole 11. The steps delineated in the exemplary process-flow diagram FIG. 6 are merely exemplary of a preferred order for the removal of sections. The steps may be carried out in another order, with or without additional steps included therein. Additionally, the steps may be carried out with an alternative embodiment of pool cleaning tool 10, as contemplated in the above description.

The method for the removal of sections 24 from pole 11 begins at step 100, during which pool cleaning tool 10 is provided having a portion of section 24a damaged. Pool cleaning tool 10 includes the components discussed above. The method then proceeds to step 110, in which a user locates the damaged section 24a. In step 120, the user locates visual indicium 20 residing between first section 24a and second section 24b. In step 130, a cutting device configured to cut pole 11 is positioned over visual indicium 20 where a user uses visual indicium 20 as a guide. Next, at step 140, a user operates the cutting device to sever first section 24a from pole it along visual indicium 20. Finally, the damaged section 24a of pole 11 is removed, such that pole 11 is configured to couple to cleaning attachment 32 in step 150. The damaged section 24a is may be removed using a saw blade designed to cut through pole 11, however, one of ordinary skill in the art would recognize other methods suitable for severing section 24a from pole 11, which also fall within the scope of invention.

After removal of first section 24a, second section 24b becomes the most distal section of pole 11 and, thus, becomes a coupling site for cleaning attachment 32. Cleaning attachment 32 has a third pair of diametrically opposed apertures 18c, whereby third pair of diametrically opposed apertures 18c are configured to align with second pair of diametrically opposed apertures 18b of second section 24b. Locking member 34 is configured to reside within at least one of the apertures of second pair of apertures 18b disposed within pole 11 and at least one of the apertures of third pair of apertures 18c disposed within cleaning attachment 32. In this manner, the user can repair pole 11 by severing damaged first section 24a from pole 11 and using second section 24b as a new coupling site for cleaning attachment 32.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A cleaning tool having removable sections comprising:
    an elongated pole having a proximal end, a distal end, and a central longitudinal axis extending from the proximal end to the distal end, the elongated pole being partitioned into a first section and a second section, the first section positioned at the distal end of the elongated pole and having a common boundary with the second section, wherein the elongated pole is a monolithic structure;
    a grip disposed at the proximal end of the elongated pole, the grip having coefficients of static and kinetic friction higher than coefficients of static and kinetic friction of the elongated pole;
    a visual indicium disposed on the elongated pole, the visual indicium delineating the common boundary separating the first section and the second section, wherein the visual indicium is a scored line;
    a first pair of diametrically opposed apertures disposed within the first section of the elongated pole, the first pair of diametrically opposed apertures being aligned along a first transverse axis perpendicular to the central longitudinal axis of the elongated pole; and
    a second pair of diametrically opposed apertures disposed within the second section of the elongated pole, the second pair of diametrically opposed apertures being aligned along a second transverse axis perpendicular to the central longitudinal axis of the elongated pole, wherein the first and the second transverse axes lie in parallel planes;
    wherein the first section of the elongated pole is configured to be a coupling site for a cleaning attachment, the cleaning attachment having a locking member configured to reside within at least one aperture of the first pair of apertures of the pole, thereby restraining the cleaning attachment against axial or rotational movement relative to the elongated pole, and wherein, subsequent to the first section of the pole being severed from the pole at the visual indicium, the second section of the pole becoming the coupling site for the cleaning attachment, and wherein the locking member is configured to reside within at least one aperture of the second pair of apertures of the pole, thereby immobilizing the cleaning attachment against axial and rotational movement relative to the elongated pole.

2. The cleaning tool of claim 1, further comprising:
    an extension pole having an inner diameter greater than an outer diameter of the elongated pole, wherein the extension pole and the elongated poles are hollow; and
    a locking mechanism in mechanical communication with the second pole, the locking mechanism configured to restrain relative movement of the elongated pole with respect to the extension pole, whereby the locking mechanism has a first unlocked configuration in which the elongated pole and the extension pole are configured to telescopically move relative to one another to adjust a collective length thereof, and a second locked configuration in which the locking mechanism immobilizes the elongated pole against telescopic movement relative to the extension pole.

3. The cleaning tool of claim 1, wherein the cleaning attachment further comprises a third pair of diametrically opposed apertures, whereby the third pair of diametrically opposed apertures is configured to align with the first pair of apertures, wherein the locking member is configured to reside within at least one aperture of the third pair of apertures of the cleaning attachment; whereby the third pair of apertures of diametrically opposed apertures on the cleaning attachment is configured to align with the second pair of apertures on the elongated pole; and wherein the locking member is configured to reside within the at least one aperture of the third pair of apertures of the cleaning attachment, thereby immobilizing the cleaning attachment against axial and rotational movement relative to the elongated pole.

4. The cleaning tool of claim 1, wherein the elongated pole includes at least four pairs of apertures and at least three visual indicia.

5. The cleaning tool of claim 1, wherein the pole is made from aluminum.

6. The cleaning tool of claim 1, wherein the pole is made from a corrosive-resistive metal.

7. The cleaning tool of claim 1, wherein the grip is made of an elastomeric material.

8. A telescopic cleaning tool having removable sections, comprising:
    a first hollow pole having a proximal end, a distal end, and a central longitudinal axis extending from the proximal end to the distal end, the first pole being partitioned into a first section and a second section, the first section positioned at the distal end of the first pole and having a common boundary with the second section, wherein the first pole is a monolithic structure;
    a second hollow pole having an inner diameter greater than an outer diameter of the first hollow pole;
    a visual indicium disposed on the first hollow pole, the visual indicium delineating the common boundary separating the first section and the second section, wherein the visual indicium is a score line;
    a first pair of diametrically opposed apertures disposed within the first section of the first pole, the first pair of diametrically opposed apertures being aligned along a first transverse axis perpendicular to the central longitudinal axis of the first pole;
    a second pair of diametrically opposed apertures disposed within the second section of the first hollow pole, the second pair of diametrically opposed apertures being aligned along a second transverse axis perpendicular to the central longitudinal axis of the first hollow pole, wherein the first and the second transverse axes lie in parallel planes; and
    a locking mechanism in mechanical communication with the second hollow pole, the locking mechanism configured to restrain relative movement of the first hollow pole with respect to the second hollow pole, whereby the locking mechanism has a first unlocked configuration in which the first hollow pole and the second hollow pole are configured to telescopically move relative to one another to adjust a collective length thereof, and a second locked configuration in which the locking mechanism immobilizes the first hollow pole against telescopic movement relative to the second hollow pole;

wherein the first section of the first hollow pole is configured to be a coupling site for a cleaning attachment, the cleaning attachment having a third pair of diametrically opposed apertures, whereby the third pair of diametrically opposed apertures is configured to align with the first pair of apertures and wherein a locking member is configured to reside within at least one aperture of the first pair of apertures of the first hollow pole and at least one aperture of the third pair of apertures of the cleaning attachment, thereby restraining the cleaning attachment against axial or rotational movement relative to the first hollow pole, and wherein, subsequent to the first section of the first hollow pole being severed from the first hollow pole at the visual indicium, the second section of the first hollow pole becoming the coupling site for the cleaning attachment, whereby the third pair of diametrically opposed apertures on the cleaning attachment is configured to align with the second pair of apertures on the second hollow pole and wherein the locking member is configured to reside within at least one aperture of the second pair of apertures of the first hollow pole and the at least one aperture of the third pair of apertures of the cleaning attachment, thereby immobilizing the cleaning attachment against axial and rotational movement relative to the first hollow pole.

9. The telescopic cleaning tool of claim 8, wherein the first hollow pole includes at least four pairs of apertures and at least three visual indicia.

10. The telescopic cleaning tool of claim 8, wherein the first hollow pole and the second hollow poles are made from aluminum.

11. The telescopic cleaning tool of claim 8, wherein the first hollow pole and the second hollow poles are made from a corrosive-resistive metal.

12. The cleaning tool of claim 8, wherein a grip is disposed at the proximal end of the first hollow pole, the grip having coefficients of static and kinetic friction higher than coefficients of static and kinetic friction of the first hollow pole.

13. A method of repairing a cleaning tool comprising:

providing a cleaning tool having a monolithically formed elongated pole partitioned into a first section and a second section, the first section being positioned at a distal end of the elongated pole the first section being a coupling site for a cleaning attachment, the first section having a first pair of diametrically opposed apertures disposed therein, and a second section having a second pair of diametrically opposed apertures disposed therein, wherein a visual indicium is disposed on the elongated pole, the visual indicium delineating a boundary separating the first section and the second section, wherein the visual indicium is a scored line;

identifying the first section as a damaged section wherein the damaged section has at least one deformed aperture;

identifying the visual indicium disposed between the first section and the second section;

placing a cutting device onto the elongated pole at the visual indicium, the cutting device configured to cut the elongated pole;

operating the cutting device such that the cutting device cuts the elongated pole along the visual indicium, thereby permanently severing the damaged section from the elongated pole;

subsequent to severing the damaged section from the elongated pole, using the second section as a new coupling site for the cleaning attachment; and operating a locking mechanism to position a locking member within at least one aperture of the second pair of apertures of the extended pole, wherein the locking member restricts the cleaning attachment against removal from the second section of the elongated pole.

\* \* \* \* \*